(12) United States Patent
Kim et al.

(10) Patent No.: US 8,244,919 B2
(45) Date of Patent: Aug. 14, 2012

(54) DATA TRANSFER APPARATUS, SYSTEM AND METHOD USING THE SAME

(75) Inventors: Kang Ho Kim, Daejeon (KR); Eun Ji Lim, Daejeon (KR); Soo Young Kim, Daejeon (KR); Sung In Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 216 days.

(21) Appl. No.: 12/509,372

(22) Filed: Jul. 24, 2009

(65) Prior Publication Data

US 2010/0228895 A1  Sep. 9, 2010

(30) Foreign Application Priority Data

Mar. 5, 2009 (KR) .................... 10-2009-0018887

(51) Int. Cl.
*G06F 3/00* (2006.01)
(52) U.S. Cl. ................ 710/5; 710/36; 718/100
(58) Field of Classification Search .................. None
See application file for complete search history.

(56) References Cited

U.S. PATENT DOCUMENTS

| 6,754,736 | B1 * | 6/2004 | Ogawa et al. | 710/39 |
| 2008/0148291 | A1 * | 6/2008 | Huang et al. | 719/320 |
| 2008/0183908 | A1 * | 7/2008 | Slater et al. | 710/11 |

FOREIGN PATENT DOCUMENTS

| KR | 1020050065133 A | 6/2005 |
| KR | 1020060067307 A | 6/2006 |

* cited by examiner

*Primary Examiner* — Eron J Sorrell

(57) ABSTRACT

A data transfer apparatus, system and method using the same are provided. A data transfer system according to an exemplary embodiment includes a user process space, a kernel space and a hardware space. A plurality of user processes are executed in the user process space. The kernel space includes a kernel thread. The hardware space performs an input/output according to the input/output request of the each user process. When input data based on the input request are received to the hardware space, the data transfer system checks whether the user process requesting the input is in an execution state, and allows the kernel thread to copy the input data from the kernel space to the user process space when the user process is in the execution state.

14 Claims, 4 Drawing Sheets

[Figure 1]
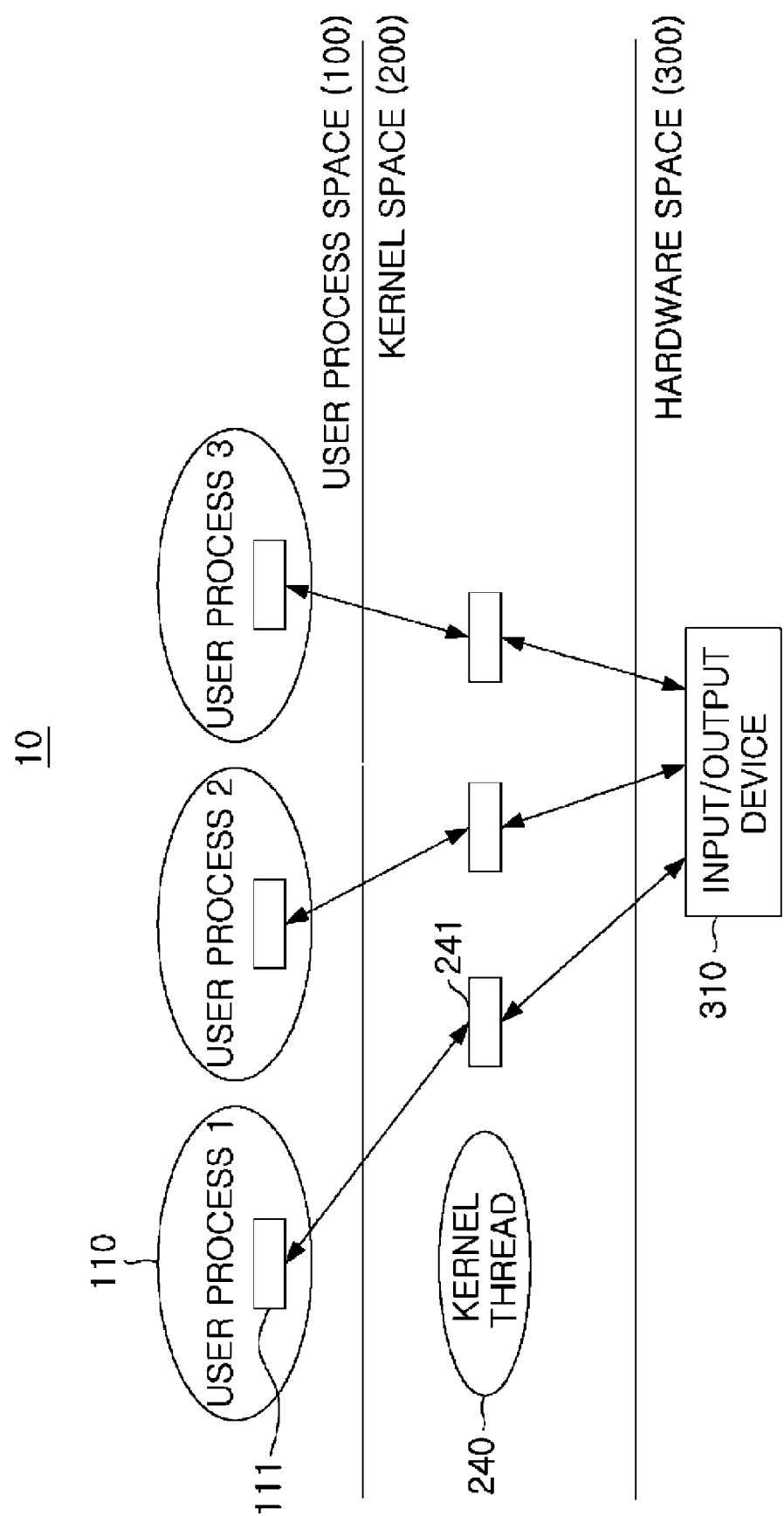

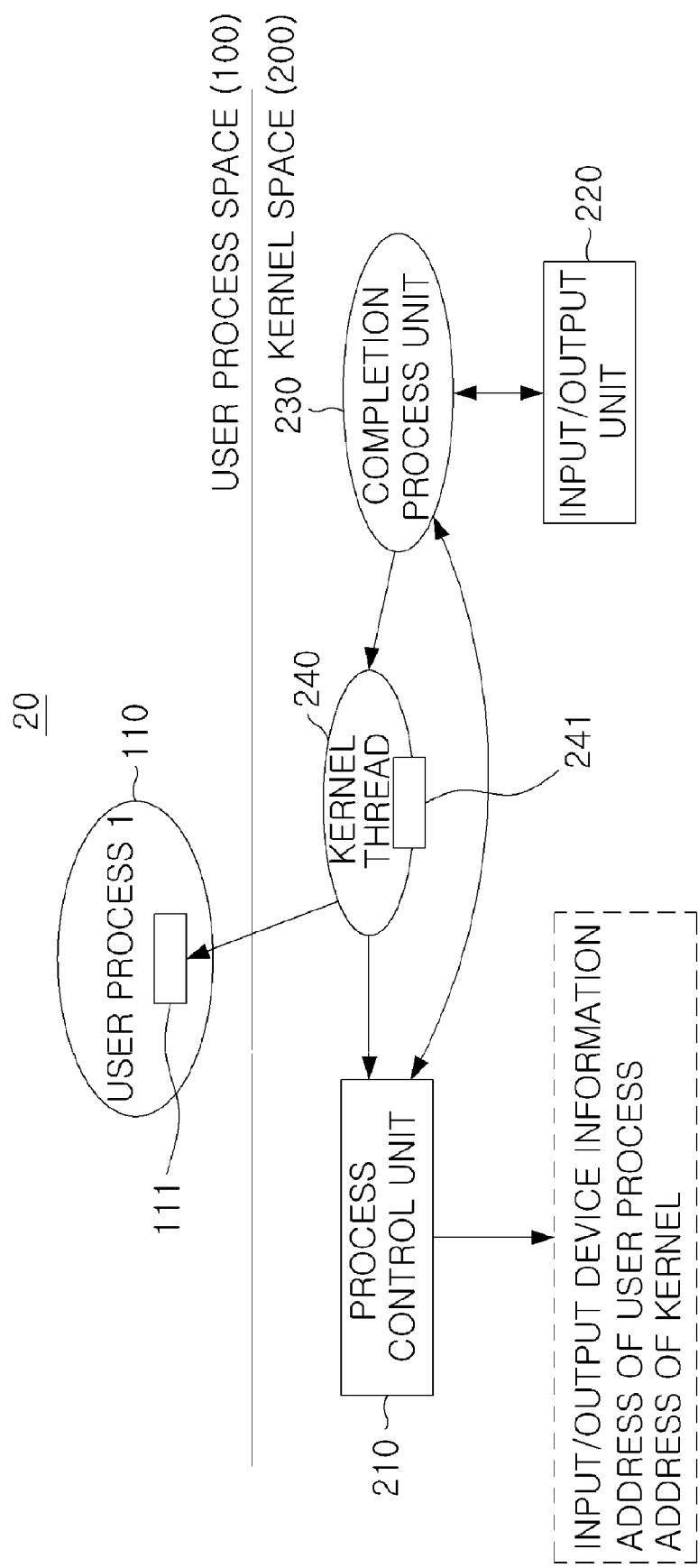

[Figure 3]
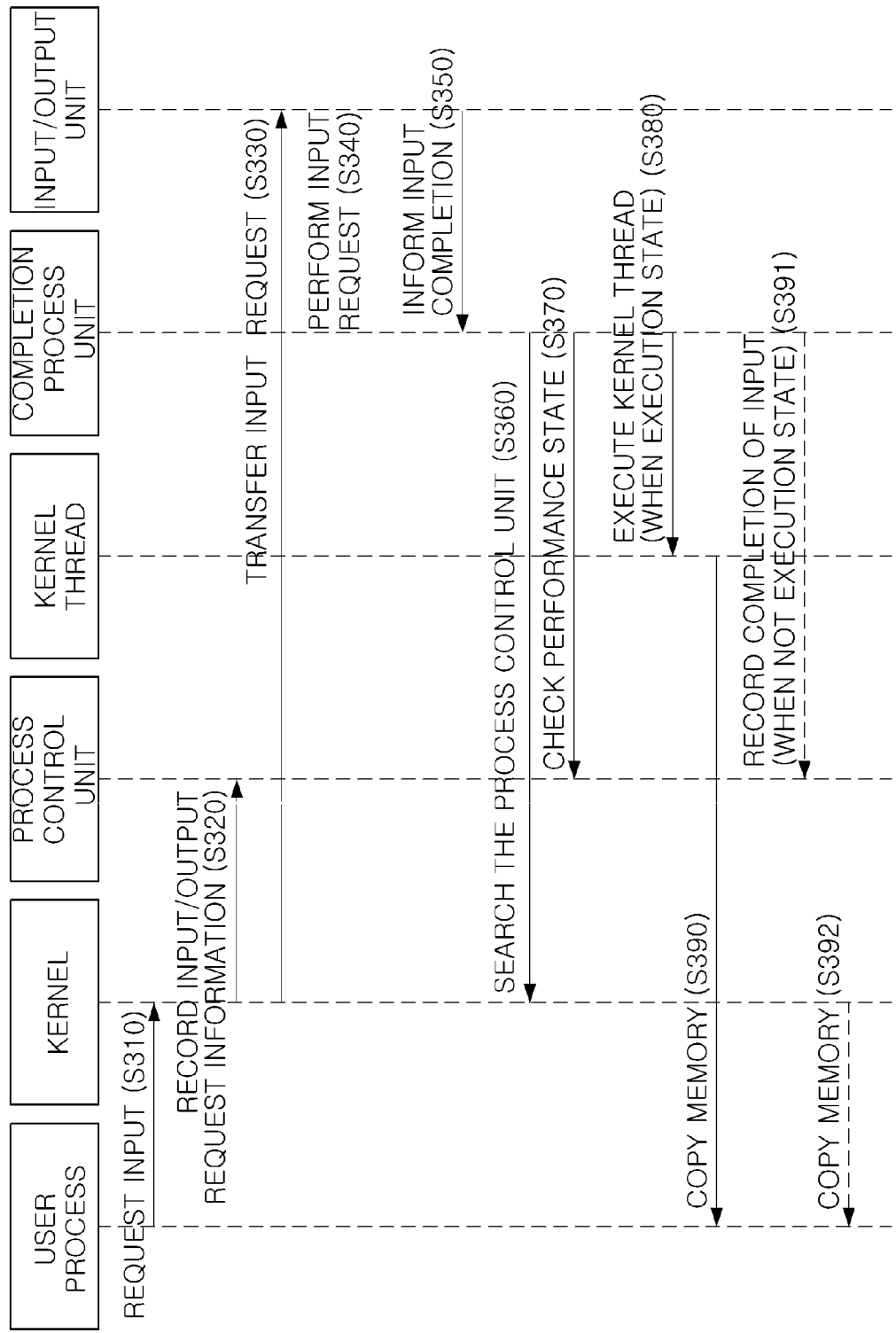

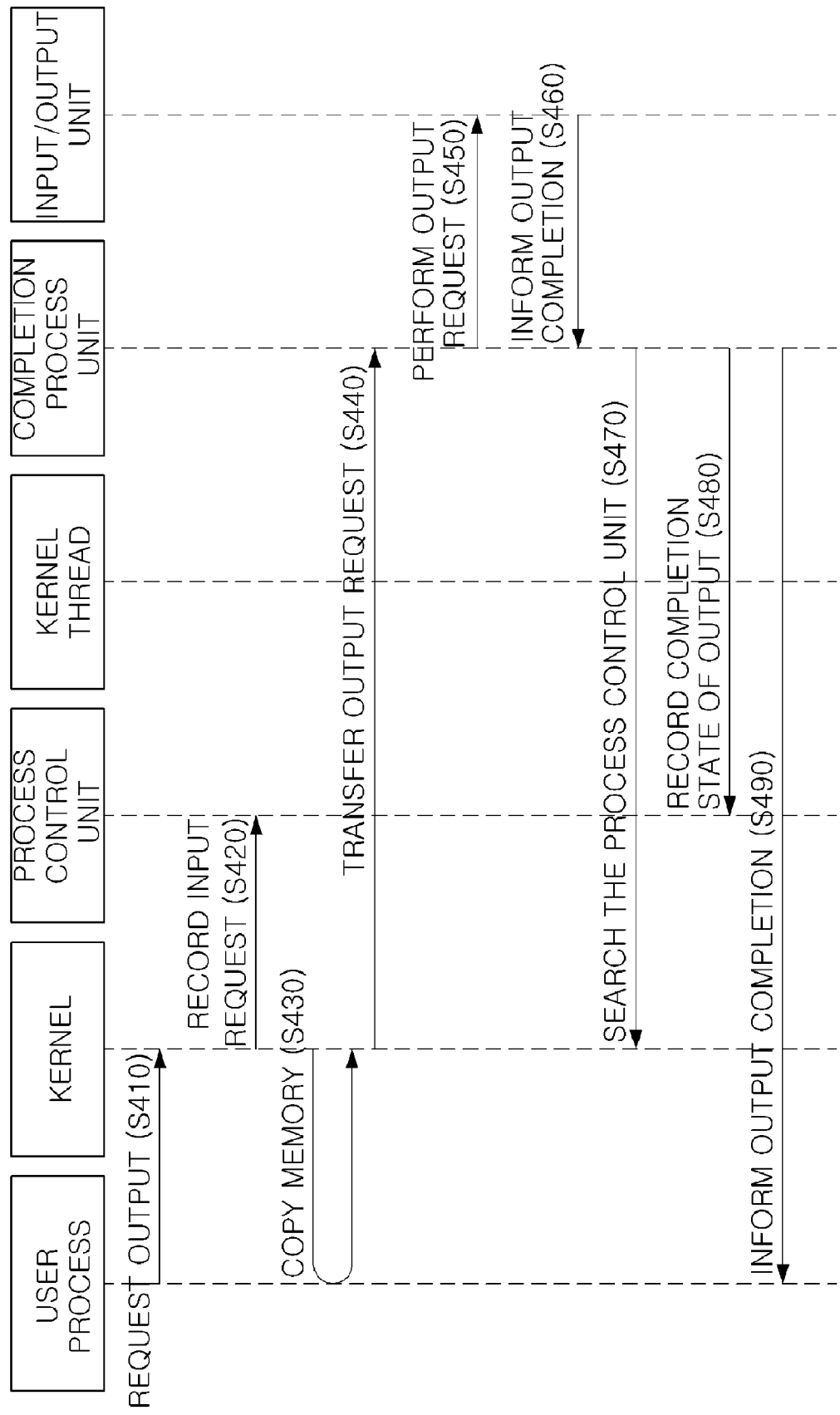

DATA TRANSFER APPARATUS, SYSTEM AND METHOD USING THE SAME

CROSS-REFERENCE TO RELATED APPLICATIONS

This application claims priority under 35 U.S.C. §119 to Korean Patent Application No. 10-2009-0018887, filed on Mar. 5, 2009, in the Korean Intellectual Property Office, the disclosure of which is incorporated herein by reference in its entirety.

TECHNICAL FIELD

The following disclosure relates to a method for transferring data between a user process and a kernel, and in particular, to a data transfer apparatus, system and method using the same, which copy the input/output data of a user process while not preventing execution of another user process.

BACKGROUND

In the operating system of a computer, input/output data are transferred over the boundary between a kernel space and a user process space.

Such a data transfer method includes a shared memory method and a memory copy method. The shared memory method stores data to be transferred in a shared memory region (which a kernel and a user process can access) and shares the stored data. The memory copy method transfers data directly from the user process space to the kernel space or from the kernel space to the user process space.

However, a related art of shared memory method has limitations in usability.

In a related art of memory copy method, a kernel accesses the address space of a user process to copy data at an arbitrary moment, and thus prevents the user process from operating efficiently. For example, when data input operation requested by a user process #2 is completed while a user process #1 is being executed, a central processing unit (CPU), in the related art of memory copy method, discontinues the execution of user process #1 and activates the address space for user process #2 thereby copying the inputted data. Accordingly, the Translation Lookaside Buffer (TLB) of user process #1 is initialized, and unnecessary content is stored in a CPU cache, reducing efficiency of the user process.

SUMMARY

In one aspect, a data transfer system includes: a user process space where a plurality of user processes are executed; a kernel space including a kernel thread; and a hardware space performing an input/output according to the input/output request of the each user process, wherein when input data based on the input request are received to the hardware space, the data transfer system checks the state of user process, and allows the kernel thread to copy the input data from the kernel space to the user process space when the user process is in the execution state.

In another aspect, a data transfer apparatus includes: a process control unit recording request information based on an input/output request of a user process; an input/output unit receiving input data from an input device and store the input data in a memory of a kernel space, based on the request information; a completion process unit checking whether the user process requesting the input is in an execution state, when storing operation of the input/output unit is completed; and a kernel thread copying data from the memory of the kernel space to a memory of the user process space, when the user process is in the execution state.

In other aspect, a data transfer method includes: receiving input data from an input device to store the received data in a memory of a kernel space according to an input request; checking whether a user process requesting the input is in an execution state; and copying data from the memory of the kernel space to a memory of the user process space when the user process is in the execution state.

In other aspect, a data transfer method includes: recording request information based on an output request of the user process; copying output data based on the request information from a memory of the user process space based on the request information to a memory of a kernel space; outputting the copied output data to an output device unit based on the request information; and informing the user process requesting the output of the output result when the user process requesting the output is in an execution state.

Other features and aspects will be apparent from the following detailed description, the drawings, and the claims.

BRIEF DESCRIPTION OF THE DRAWINGS

FIG. 1 is a block diagram illustrating a data transfer system according to an exemplary embodiment.

FIG. 2 is a block diagram illustrating a data transfer apparatus according to an exemplary embodiment.

FIG. 3 is a flowchart illustrating a data transfer method according to an exemplary embodiment when a user process requests an input.

FIG. 4 is a flowchart illustrating a data transfer method according to an exemplary embodiment when a user process requests an output.

DETAILED DESCRIPTION OF EMBODIMENTS

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a block diagram illustrating a data transfer system according to an exemplary embodiment.

Referring to FIG. 1, a data transfer system 10 according to an exemplary embodiment includes a user process space 100, a kernel space 200, and a hardware space 300.

The user process space 100 is a space where a user process 110 and a plurality of other user processes are executed by a CPU, and each of the user processes has a process memory 111 storing input/output data.

The kernel space 200 is a space where a kernel operates, and includes a kernel thread 240, a kernel memory 241, and a plurality of other kernel memories.

When the kernel receives an input request or an output request from the user process 110, the kernel thread 240 copies data between the user process space 100 and the kernel space 200.

When input data are inputted from an input/output device 310 and are stored in the kernel memory 241 according to the input request of the user process 110, the kernel thread 240 copies the input data to the process memory 111 of the user process 110, under execution state of the user process 110 requesting the input. At this point, the execution state of the user process 110 may be checked by the kernel thread 240 or other elements of the kernel space 200. Also, the kernel thread 240 copies output data, which are stored in the process memory 111 of the user process 110, to the kernel memory 241 according to the output request of the user process 110. When the user process 110 is in an execution state, the kernel thread 240 informs the user process 110 of the fact that the output operation of the output data has been completed. At this point, the execution state of the user process 110 may be checked by the kernel thread 240 or other elements of the kernel space 200.

The kernel memory 241 stores the input data which are inputted from the input/output device 310 according to the input request of the user process 110, or stores the output data which are copied from the process memory 111 of the user process space 100 by the kernel thread 240 according to the output request of the user process 110.

The hardware space 300 includes the input/output device 310 including a keyboard, a mouse, a speaker and a headset.

The hardware space 300 outputs the output data which are stored in the kernel memory 241 of the kernel space 200, according to the output request of the user process 110 and/or the other user processes. When the output operation of the output data of the hardware space 300 is completed, the completion result of the output is informed to the user process requesting the output, under execution state of the user process.

The hardware space 300 receives the input data according to the input request of the user process 110 and stores the received data in the kernel memory 241. Herein, when the input data are stored in the kernel memory 241 by the hardware space 300, the stored input data are transferred to the user process 110 requesting the input under execution state of the user process 110.

The kernel space 200 or the user process space 100 may further include a process control unit (not shown). The process control unit may record request information including at least one of the maximum size of inputable/outputable data, an operation state for a request, the address of a user process and the address of a kernel space. For example, the maximum size of the inputable/outputable data may be the size of the memory in the each space. The address of the user process may be the address of the user process requesting the input/output or the address of the associated process memory 111. The address of the kernel space may be the start address of the kernel or the address of the associated kernel memory 241.

In the data transfer system 10 according to an exemplary embodiment, the CPU executes one of the plurality of user processes at a time. Herein, upon asynchronous input/output, the CPU executes user processes #2 to #n (n is a natural number more than 2) without waiting the completion of input/output for a user process #1. When input/output for the user process #1 is completed under execution state of the user processes #2 to #n, the CPU waits until the user process #1 is in execution state and then copies input data which is inputted or informs the fact that the output of output data has been completed, and thus allows the user processes #1 to #n to be efficiently executed.

The following description will be made with reference to FIG. 2 on a data transfer apparatus according to an exemplary embodiment.

Referring to FIG. 2, a data transfer apparatus 20 according to an exemplary embodiment includes a process control unit 210, an input/output unit 220, a completion process unit 230 and a kernel thread 240.

The data transfer apparatus 20 copies input data stored in the kernel memory 241 to the process memory 111 according to the input request of the user process 110, or copies output data stored in the process memory 111 to the kernel memory 241 according to the output request of the user process 110. The operation of the data transfer apparatus 20 will be described based on the input request of the user process 110.

The process control unit 210 records input/output request information based on the input request of the user process 110. Herein, the input/output request information includes at least one of the information of an input/output device, the maximum size of inputable/outputable data, an operation state for an input/output request, the address of a user process and the address of a kernel space. The process control unit 210 may be disposed in the user process space 100 or the kernel space 200, and may record the input/output request information according to the control of the kernel.

The process control unit 210 may be implemented for a group of one or more user processes or for the each user process.

The input/output unit 220 receives input data from the input/output device 310 based on input/output request information according to an input request, and stores the input data in the kernel memory 241 based on the input/output request information.

When the input data are stored by the input/output unit 220, the completion process unit 230 checks whether the user process 110 requesting an input is in execution state. At this point, the completion process unit 230 searches the input/output request information recorded in the process control unit 210, thereby checking the execution state of the user process 110 using the address of the user process in the input/output request information.

When the check result shows that the user process 110 is in the execution state, the kernel thread 240 copies the input data, which are stored in the kernel memory 241, to the process memory 111 according to scheduling priority.

When the check result shows that the user process 240 is not in the execution state, the kernel thread 240 waits until the user process 110 is executed, and copies the input data stored in the kernel memory 241 to the process memory 111 when the user process 110 is executed.

The following description will be made on the operation of the data transfer apparatus 20 based on the output request of the user process 110.

The process control unit 210 records the input/output request information according to the output request of the user process 110. Herein, when the kernel receives the output request of the user process 110, the process control unit 210 may record the input/output request information, which may further include information for an output device.

When the kernel receives the output request of the user process 110, it allows the kernel thread 240 to copy output data from the process memory 111 to the kernel memory 241 based on the input/output request information.

The input/output unit 220 outputs the output data, which are copied to the kernel memory 241 by the kernel thread 240, through the input/output device 310 based on the input/output request information.

When the user process 110 is in an execution state, the completion process unit 230 informs the fact that the output of the output data has been completed though the input/output unit 220. When the user process 110 is not in the execution state, the completion process unit 230 may wait until the user process 110 is executed and then inform the fact that the output of the output data has been completed.

The data transfer apparatus 20 performs a data copy between the kernel space 200 and the user process space 100 at an appropriate time (for example, the user process requesting an input/output is in an execution state), and thus copies the data without preventing the execution of other user process(es). Moreover, exemplary embodiments prevent the initialization of a TLB and the uselessness of a CPU cache, resulting in the improvement of system performance.

Exemplary embodiments may additionally include the process control unit 210 and the completion process unit 230, and thus improve the execution performance of the user process even without correcting a source code for the user process.

Hereinafter, a data transfer method according to an exemplary embodiment will be described with reference to FIGS. 3 and 4.

FIG. 3 is a flowchart illustrating a data transfer method according to an exemplary embodiment when the user process requests an input.

Referring FIG. 3, when the kernel receives the input request of the user process 110 in step S310, it records the input/output request information in the process control unit 210 in step S320. The input/output request information may include at least one of the maximum size of inputable/outputable data, an operation state for a request, the address of a user process and the address of a kernel space.

The kernel transfers the input request of the user process 110 to an input device based on the input/output request information in step S330. The input device stores the input data in the kernel memory 241 based on the input/output request information in step S340, and informs the completion process unit 230 of the fact that the input has been completed in step S350.

The completion process unit 230 searches the process control unit 210 based on the input/output request information in step S360, and checks the user process 110 to determine whether the user process 110 is in an execution state in step S370.

When the determination result shows that the user process 110 is in the execution state, the data transfer apparatus 20 invokes the kernel thread 240 in step S380 and copies the input data from the kernel memory 241 to the process memory 111 in step S390.

When the user process 110 is in the execution state, the completion process unit 230 instantaneously executes the kernel thread 240 in step S380, and allows the kernel thread 240 to copy the input data of the kernel memory 241 to the process memory 111 of the user process 110 in step S390. When the completion process unit 230 executes the kernel thread 240, since the input data are immediately copied, the scheduling priority of the kernel thread 240 increases at the highest level. The scheduling priority may be controlled by the kernel, or may be controlled by the user process or the CPU.

When the user process 110 is not in the execution state, the completion process unit 230 updates an operation state for the request recorded in the process control unit 210 to the completion state of the input and records the updated result in step S391.

When the user process 110 is selected and executed by the process scheduler of the user process space 100, the kernel copies the input data from the kernel memory 241 to the process memory 111 in step S392.

An exemplary embodiment checks whether the user process 110 is in the execution state, and copies the input data through the kernel thread 240 when the user process 110 is in the execution state, thereby not preventing the execution of other user process(es).

The data transfer apparatus 20 copies the input data based on the input request, like in the flowchart of FIG. 3. Like in FIG. 4, the data transfer apparatus 20 copies output data based on an output request.

FIG. 4 is a flowchart illustrating a data transfer method according to an exemplary embodiment when the user process requests an output.

Referring FIG. 4, when the output of the user process 110 is requested in step S410, the kernel records the input/output request information in the process control unit 210 in step S420. Herein, the input/output request information may include at least one of the maximum size of inputable/outputable data, an operation state for a request, and the address of each of the memories 111 and 241.

The kernel copies the output data from the user process space 100 to the kernel space 200, in step S430.

Then, the kernel transfers the output request to the completion process unit 230 in step S440, and the completion process unit 230 outputs the output data stored in the kernel memory 241 to the output device in step S450.

When the fact is confirmed that the output data have been output to the input/output device 310 in step S460, the completion process unit 230 searches the user process 110 and the process control unit 210 in step S470, and updates an operation state for the request, which is recorded in the process control unit 210, to the completion state of the output and records the updated result in step S480. The completion process unit 230 checks whether the user process 110 is in the execution state, and informs the output result when the user process 110 is in the execution state in step S490.

When the user process 110 is not in the execution state, the completion process unit 230 may wait until the user process 110 is executed, and then inform the output result when the user process 110 is in execution state.

An exemplary embodiment checks whether the user process 110 is in the execution state, and informs the completion of output operation in the time of the user process 110 is in the execution state, thereby not preventing the execution of other user process(es).

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. A data transfer system, comprising:
a user process space where a plurality of user processes is executed;
a kernel space comprising a kernel thread; and
a hardware space configured to perform data input/output according to an input/output request of each of the user processes,
wherein when input data based on an input request is received by the hardware space, the data transfer system checks whether a user process requesting the data input is in an execution state, and allows the kernel thread to copy the input data from the kernel space to the user process space if the user process is in the execution state and to delay the copying of the input data until the user process is executed if the user process is not in the execution state, and wherein the kernel thread is configured to copy output data from the user process space to the kernel space according to an output request of a user process, and the copied output data are outputted to the hardware space based on the output request.

2. The data transfer system of claim 1, wherein the kernel space comprises a process control unit, wherein the process control unit records request information based on the input request of the user process, the request information comprising any of a maximum size of inputable/outputable data, an operation state for the input/output request, an address of the user process space and an address of the kernel space.

3. A data transfer apparatus, comprising:

a process control unit configured to record request information based on an input/output request of a user process;

an input/output unit configured to receive input data from an input device based on the request information and to store the input data in a memory of a kernel space based on the request information;

a completion process unit configured to check whether a user process requesting the input data is in an execution state when the storing operation of the input/output unit is completed; and a kernel thread configured to copy the input data from the memory of the kernel space to a memory of the user process if the user process is in the execution state and to delay the copying of the input data until the user process is executed if the user process is not in the execution state.

4. The data transfer apparatus of claim 3, wherein the request information includes at least one of a maximum size of inputable/outputable data, an operation state for the data input/output request, an address of the user process, or an address of the kernel space.

5. The data transfer apparatus of claim 3, wherein the kernel thread is configured to copy the input data according to a command of the completion process unit when the user process is in the execution state.

6. The data transfer apparatus of claim 3, wherein:

the kernel thread is configured to copy output data from a memory of the user process to the memory of the kernel space based on the request information according to the output request of the user process, the input/output unit is configured to output the output data, which are copied to the memory of the kernel space, through an output device based on the request information, and the completion process unit is configured to inform the user process requesting the data output of a fact that the data output has been completed when the user process is in the execution state.

7. The data transfer apparatus of claim 3, wherein the process control unit is disposed in the kernel space.

8. A data transfer method, comprising:

receiving input data from an input device to store the input data in a memory of a kernel space according to an input request of a user process requesting the input data;

checking whether the user process is in an execution state;

copying the input data from the memory of the kernel space to a memory of the user process if the user process is in the execution state;

delaying the copying of the input data until the user process is executed if the user process is not in the execution state;

copying output data from the memory of the user process to the memory of the kernel space according to an output request of the user process; and outputting the copied output data to an output device.

9. The data transfer method of claim 8, further comprising:

recording request information based on the input request; and searching the user process by using the recorded request information.

10. The data transfer method of claim 9, wherein the request information comprises any of a maximum size of inputable/outputable data, an operation state for the input request, an address of the user process, and an address of the kernel space.

11. A data transfer method, comprising:

recording request information based on an output request of a user process;

copying output data from a memory of the user process to a memory of a kernel space based on the request information;

outputting the copied output data to an output device based on the request information;

checking whether the user process is in an execution state;

informing the user process of the output result when the user process is in an execution state; and delaying the informing of the output result until the user process is executed when the user process is not in the execution state.

12. The data transfer method of claim 11, wherein the request information comprises any of a maximum size of inputable/outputable data, an operation state for the output request, an address of the user process, and an address of the kernel space.

13. The data transfer method of claim 11, further comprising:

receiving input data from an input device based on an input request;

storing the input data in the memory of the kernel space;

checking whether the user process is in an execution state; and copying the input data to the memory of the user process when the user process is in the execution state.

14. The data transfer method of claim 13, further comprising delaying the copying of the input data until the user process is executed when the user process is not in the execution state.

* * * * *